March 10, 1953 W. R. HALL 2,630,628
DOUBLE-ACTION CAM FOR ELECTRICAL
PORTABLE HEDGE TRIMMERS
Filed Aug. 11, 1951
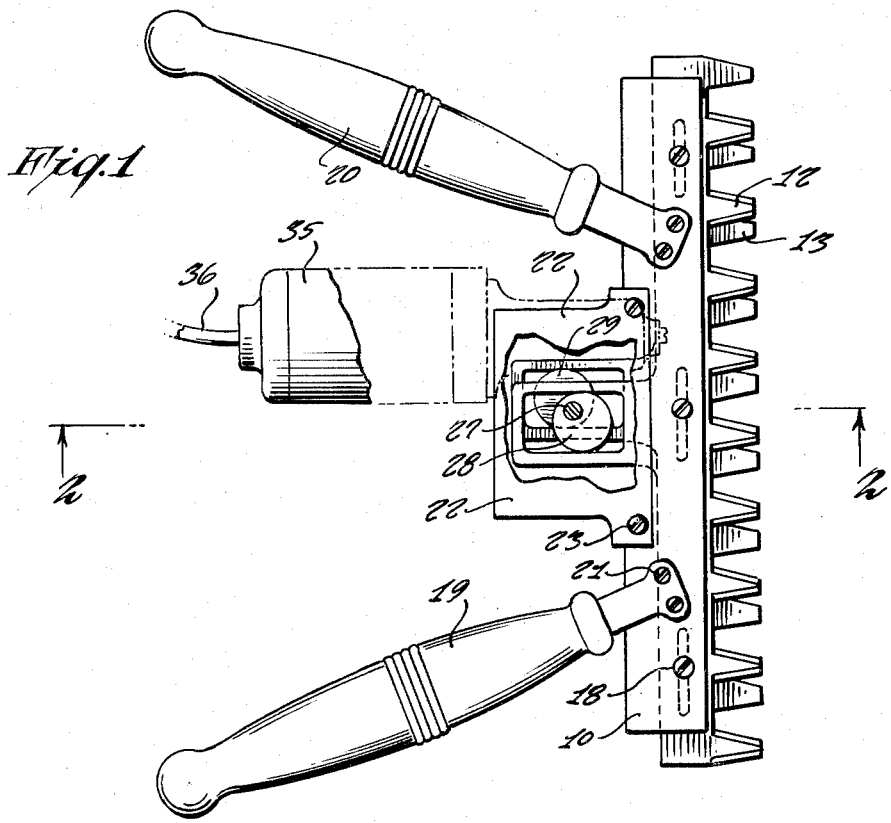
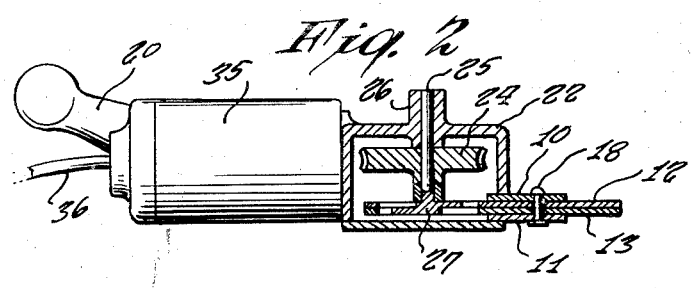
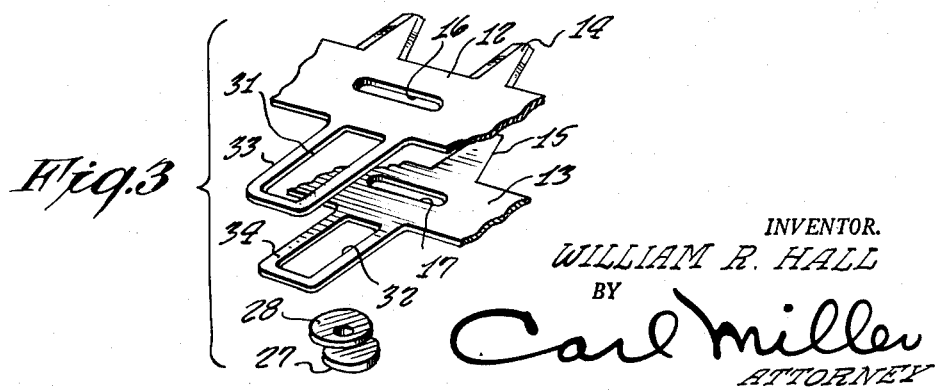
INVENTOR.
WILLIAM R. HALL
BY
Carl Miller
ATTORNEY Patented Mar. 10, 1953

2,630,628

UNITED STATES PATENT OFFICE 2,630,628

DOUBLE-ACTION CAM FOR ELECTRICAL PORTABLE HEDGE TRIMMERS

William R. Hall, New Hyde Park, N. Y.

Application August 11, 1951, Serial No. 241,442

1 Claim. (Cl. 30—216)

This invention relates to a portable electric hedge trimmer.

It is an object of the present invention to provide a portable electric hedge trimmer wherein there are two blades which are operable relative to one another and which are driven by a single double acting cam and two cam portions respectively connected with rearward extending projections of the respective blades and wherein the cam is driven by a single electric motor.

Another object of the invention is to provide an electric hedge trimmer employing two blades which are operated simultaneously, that is of simple construction, inexpensive to manufacture, has a minimum number of parts, compact, durable and efficient in operation.

For other objects and for a better understanding of the present invention, reference may be had to the following detailed description, taken in connection with the accompanying drawing, in which Fig. 1 is a top side view of the portable electrical hedge trimmer, embodying the features of the present invention with the top plate broken away to show the double acting cam which is connectable with the blades.

Fig. 2 is a vertical sectional view of the trimmer, taken on line 2—2, of Fig. 1, and shows a driving gear mechanism with an electric motor forming a part thereof.

Fig. 3 is a fragmentary perspective and collective view of the blades and their projections and the double cam that cooperates therewith.

Referring now to the figures, 10 and 11 represent respectively top and bottom supporting plates, for retaining upper and lower cutting blades 12 and 13. These blades 12 and 13 have cutting projection 14 adapted to cooperate with one another to affect cutting action. The top blade 12 has elongated slots 16 and the bottom blade 13 has elongated slots 17. Attaching screws 18 extend through the elongated holes in the blades and the round holes in the supporting plates 10 and 11. The cutting blades will accordingly be guided in their lateral shifting movements upon the supporting plates. Supporting handles 19 and 20 are respectively secured to the top supporting plate 10 by screws 21.

Also connected to the top supporting plate 10 is the box 22 by means of screws 23. This box contains a helical worm wheel 24 and a vertical shaft 25 journalled in upwardly extending bearing portion 26 of the box 22 and through which the worm wheel gear 24 is fixed. Shaft 25 has a double cam element 27 on its lower end having cam portions 28 and 29 respectively operable in elongated slots 31 and 32 of respectively rearwardly extending projections 33 and 34 of the respective blades 12 and 13. An electric motor 35 having a worm not shown is fixed to the box 22. This worm engages with the worm wheel 24 to rotate the same and to rotate the shaft 25 and the double cam 27. An electric cable 36 extends from the electric motor.

The blade projections 33 and 34 extend to the box 22. As the electric motor is operated, the cam 27 will be rotated with sufficient speed and the action of the cam portions is such as to cause the blades 12 and 13 to be reciprocated with respect to one another and to effect the cutting action. It will be apparent that with the cutting action of two blades moving oppositely to one another that a faster cutting action will be effected.

While various changes may be made in the detail construction, it shall be understood that such changes shall be within the spirit and scope of the present invention as defined by the appended claim.

Having thus set forth and disclosed the nature of my invention, what I claim is:

A portable electric hedge trimmer, comprising two longitudinal parallel supporting members spaced apart from each other, upper and lower cutting blades, slidably connected between the said supporting members, handle means connected to the supporting members and extending rearwardly therefrom, a gear box connected to the said supporting members, an electric motor connected to the gear box, gears within the gear box and a drive shaft, a cam having integrally two oppositely arranged eccentrics, the said eccentrics being disposed in the respective planes of the said blade, projections extending rearwardly from the respective cutting blades, said cam having cam portions engageable with the respective rearwardly extending projections of the blade and operable thereon to effect the reciprocation of the respective blades.

WILLIAM R. HALL.

REFERENCES CITED

The following references are of record in the file of this patent:

UNITED STATES PATENTS

| Number | Name | Date |
|---|---|---|
| 527,224 | Thyll | Oct. 9, 1894 |
| 2,380,787 | Pierce et al. | July 31, 1945 |
| 2,509,564 | Hall | May 30, 1950 |